(12) United States Patent
Gorbatyuk et al.

(10) Patent No.: US 12,548,228 B2
(45) Date of Patent: *Feb. 10, 2026

(54) ENTERTAINING MOBILE APPLICATION FOR ANIMATING A SINGLE IMAGE OF A HUMAN BODY AND APPLYING EFFECTS

(71) Applicant: Snap Inc., Santa Monica, CA (US)

(72) Inventors: Sergei Gorbatyuk, London (GB); Nikolai Smirnov, London (GB); Aleksandr Mashrabov, Los Angeles, CA (US); Egor Nemchinov, London (GB)

(73) Assignee: Snap Inc., Santa Monica, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/673,574

(22) Filed: May 24, 2024

(65) Prior Publication Data

US 2024/0312099 A1    Sep. 19, 2024

Related U.S. Application Data

(63) Continuation of application No. 17/869,799, filed on Jul. 21, 2022, now Pat. No. 12,026,817, which is a
(Continued)

(51) Int. Cl.
*G09G 5/00* (2006.01)
*G06F 3/0482* (2013.01)
(Continued)

(52) U.S. Cl.
CPC ............ *G06T 13/40* (2013.01); *G06F 3/0482* (2013.01); *G06F 3/04845* (2013.01);
(Continued)

(58) Field of Classification Search
CPC .............. G09G 5/14; G09G 2340/10; G09G 2340/125; G06T 11/60; G06T 15/503; G06T 2207/30196; G06T 2207/10016; G06T 7/13; G06T 7/50; G06T 2200/24; G06T 2207/10024; G06T 2207/20221; G06T 11/203; G06T 11/00; G06T 1/60; G06T 7/248; G06T 7/74; G06T 5/50; G06F 3/017; G06F 40/20; G06F 40/40; G06V 20/56; G06V 30/1423; H04N 23/69; H04N 23/60; H04N 21/8545; G02B 27/001;
(Continued)

(56) References Cited

U.S. PATENT DOCUMENTS

| | | | |
|---|---|---|---|
| 6,738,065 B1 * | 5/2004 | Even-Zohar | G06Q 30/06 345/473 |
| 2010/0111370 A1 * | 5/2010 | Black | G06F 18/2321 705/26.1 |
| 2014/0189056 A1 * | 7/2014 | St. Clair | H04L 67/55 709/217 |

* cited by examiner

*Primary Examiner* — Gordon G Liu
(74) *Attorney, Agent, or Firm* — Georgiy L. Khayet

(57) ABSTRACT

Provided are systems and methods for animating a single image of a human body and applying effects. An example method includes receiving an image of a body, receiving, via a user interface, a user input including parameters associated with a motion, fitting a portion of the image of the body to a hair model designed to generate a hair image corresponding to the motion, where the portion of the image of the body includes hair, and generating a video featuring the body repeating the motion, where the generation of the video is based on the image of the body, the parameters associated with the motion, and the hair image generated by the hair model.

20 Claims, 14 Drawing Sheets

Related U.S. Application Data continuation of application No. 17/019,875, filed on Sep. 14, 2020, now Pat. No. 11,410,365, which is a continuation of application No. 16/551,756, filed on Aug. 27, 2019, now Pat. No. 10,776,981, which is a continuation-in-part of application No. 16/434,185, filed on Jun. 7, 2019, now Pat. No. 10,839,586.

(51) Int. Cl.
*G06F 3/04845* (2022.01)
*G06T 7/194* (2017.01)
*G06T 7/20* (2017.01)
*G06T 7/70* (2017.01)
*G06T 13/40* (2011.01)
*G06T 19/00* (2011.01)

(52) U.S. Cl.
CPC ............... *G06T 7/194* (2017.01); *G06T 7/20* (2013.01); *G06T 7/70* (2017.01); *G06T 19/00* (2013.01); *G06T 2200/24* (2013.01); *G06T 2207/10016* (2013.01); *G06T 2207/30196* (2013.01)

(58) Field of Classification Search
CPC ....... G02B 2027/0138; G02B 2027/014; B25J 9/1689; B25J 9/1697
USPC ........................................................ 345/629
See application file for complete search history.

ENTERTAINING MOBILE APPLICATION FOR ANIMATING A SINGLE IMAGE OF A HUMAN BODY AND APPLYING EFFECTS

CROSS-REFERENCE TO RELATED APPLICATION

This application is a Continuation of and claims the priority benefit of U.S. patent application Ser. No. 17/869,799, entitled "Entertaining Mobile Application for Animating a Single Image of a Human Body and Applying Effects," filed on Jul. 21, 2022, which in turn is a Continuation of and claims the priority benefit of U.S. patent application Ser. No. 17/019,875, entitled "Entertaining Mobile Application for Animating a Single Image of a Human Body and Applying Effects," filed on Sep. 14, 2020, which in turn is a Continuation of, and claims the priority benefit of, U.S. patent application Ser. No. 16/551,756, entitled "Entertaining Mobile Application for Animating a Single Image of a Human Body and Applying Effects," filed on Aug. 27, 2019, which is a Continuation-in-part of U.S. patent application Ser. No. 16/434,185, entitled "Single Image-based Real-Time Body Animation," filed on Jun. 7, 2019. The aforementioned applications are incorporated herein by reference in their entirety for all purposes.

TECHNICAL FIELD

This disclosure generally relates to digital image processing. More particularly, this disclosure relates to methods, systems, and a mobile application for animating a single image of a human body and applying effects.

BACKGROUND

Body animation can be used in many applications, such as advertisements, entertainment shows, social media networks, computer games, videos, video conversations, virtual reality, augmented reality, and the like. An animation of a body of a person based on a single photograph can be specifically useful in various applications. For example, a person on the photograph can "come alive" by performing movements similar to a real video (for example, dancing, performing acrobatics, fighting, and so forth). Animation of the body of a person based on a single photograph entails creating a realistic model of a body of a particular person and having the model perform actions or interactions within scenes.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
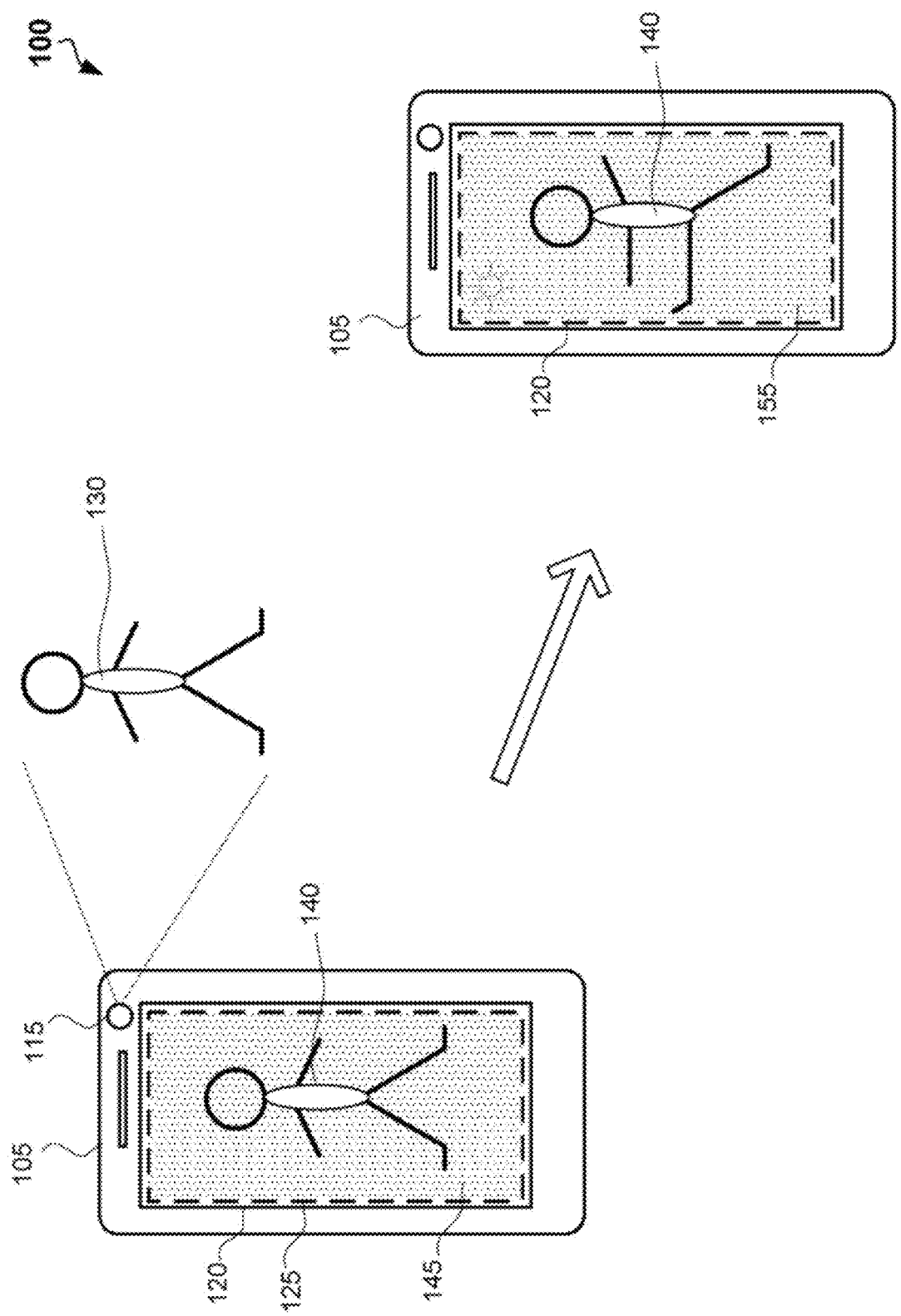
FIG. 1 shows an example environment, wherein a method for animating a single image of a human body and applying effects can be practiced, according to some embodiments.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods, systems, and a mobile application for animating a single image of a human body and applying effects. The methods and systems of the present disclosure can be designed to work on mobile devices, such as smartphones, tablet computers, or mobile phones, in real-time and without connection to the Internet or the need for use of server-side computational resources, although the embodiments can be extended to approaches involving web service or a cloud-based resources. While some embodiments of the present technology will be described in reference to operations of a mobile device, the present technology can be practiced on other computing devices, such as personal computer, server, network node, and so forth using a variety of technologies. For example, methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium.

Some embodiments of the disclosure may allow real-time animation of a single image of a body of a person and applying effects. In some embodiments, an application is provided. The application may receive an image of a person and perform segmentation of the image and pose estimation. The segmentation of the image may include determining a "mask" of pixels denoting area where the person is in the image. The segmentation can be carried out using a first specially trained neural network. A second neural network can be used to detect the person's "skeleton," that is a set of pivotal key points representing a head, shoulders, chest, legs, hands, and so forth.

The "mask" of pixels denoting the area of the person in the image and the skeleton can be used to generate, by the application, an approximate (generic) model of the person. The generation of the generic model can be performed using a third neural network. The generic model can be generated both in a form of three-dimensional (3D) mesh and a set of pose and shape parameters. The pose and shape parameters can be used further for animation.

The generic model can be further adjusted by the application to obtain a reconstructed model that fits the person's silhouette and shapes perfectly. The application may extract texture from the input image and generate a texture map to dress the person. Alternatively, the application may allow a user to substitute the texture map with a further texture map representing other desired clothes.

The application may further allow the user to select a motion from a database of motions. The motion can be represented by a sequence of pose parameters. Next, the application can animate the reconstructed model based on the selected motion by passing the sequence of pose parameters to the reconstructed model to generate an output video. The reconstructed model can be dressed using a previously created texture map. The application may also allow selecting a special scene or background. The application may insert the reconstructed model in the selected scene or background. The application may allow saving the output video or sharing the output video via social media networks.

According to one embodiment of the disclosure, a method for animating a single image of a human body and applying effects is provided. The method may include providing, by a computer device, a database of motions. The method may allow receiving, by a computing device, an input image. The input image includes a body of the person. The method may include receiving, by the computing device, a user input including a motion selected from the database of motions. The method may include segmenting, by the computing device, the input image into a body portion and a background portion. The body portion includes pixels of the input image corresponding to the body of the person. The method may include generating, by the computing device and based on the body portion and the selected motion, a video featuring the body of the person repeating the selected motion. The method may include displaying, by the computing device, the generated video.

The method may further include receiving, by the computing device, a further user input. The further input may include a name of at least one social network. The method may include posting, by the computing device, the generated video on a timeline of a user of the computing device in the at least one social network.

The method may include, prior to generating the video, receiving, by the computing device, a further user input. The further user input may include clothes selected from a list. The method may include, while generating the video, substituting clothes of the person in frames of the video with the selected clothes.

The method may include, prior to generating the video, receiving, by the computing device, a further user input. The further user input may include a scene selected from a list of scenes. The method may include, while generating the video, substituting a background of frames of the video with the selected scene.

The method may include, prior to generating the video, receiving, by the computing device, a further user input. The further user input may include an illumination effect selected from a list of illumination effects. The method may include, while generating the video, applying the illumination effect to frames of the video.

The method may include, prior to generating the video, receiving, by the computing device, a further user input, the further user input including an object selected from a list of objects. The method may include, while generating the video, adding the selected object to frames of the video. Adding the selected object may include attaching the selected object to a hand of the person.

The method may include, prior to generating the video, fitting the body portion to a hair model. The method may include, while generating the video, detecting positions of key points associated with a head of the person in a frame of the video and generating, based on the positions of the key points and the hair model, an image of hair of the person. The method may include inserting the image of the hair in the frame.

The method may include capturing, by the computing device, a custom video of the person performing a custom motion. The method may include determining, based on the custom video, a set of parameters representing the custom motion. The method may include adding the set of parameters to the database of motions as a new motion.

While generating video, the method may include determining that a pre-determined number of frames of the video have been generated, with the pre-determined number being less than a total number of frames in the generated video. The method may further include displaying the pre-determined number of frames of the video while rest of the frames of the video are generated.

Generation of the video may include generating an image of the body of the person adopting at least one pose from the selected motion. Generation of the video may further include generating a frame based on the background portion and the image. Generation of the video may further include modifying the frame by applying one or more visual effects. The visual effects may include an illumination effect, background substitution, clothes substitution, and insertion of an ambient object.

Generation of the video may include generating a set of images of the body of the person adopting poses from the selected motion. Generation of the video may also include overlaying each set of images with a background scene from a set of pre-generated background scenes to generate frames. Each background scene of the set of the pre-generated background scenes can be modified by applying one or more visual effects to the background scene. The visual effects may include an illumination effect, background substitution, clothes substitution, and insertion of an ambient object.

According to another embodiment, a system for animating a single image of a human body and applying effects is provided. The system may include at least one processor and a memory storing processor-executable codes, wherein the at least one processor can be configured to implement operations of the above-mentioned method for animating a single image of a human body and applying effects upon execution of the processor-executable codes.

Referring now to the drawings, exemplary embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for animating a single image of a human body and applying effects can be practiced. The environment 100 may include a computing device 105 and a user 130. The computing device 105 may include a camera 115 and a graphical display system 120. The computing device 105 can refer to a mobile device such as a mobile phone, a smartphone, or a tablet computer. In further embodiments, however, the computing device 105 can refer to a personal computer, laptop computer, netbook, set top box, television device, multimedia device, personal digital assistant, game console, entertainment system, or any other computing device.

In certain embodiments, the computing device 105 may be configured to capture an input image 125 of the user 130, via, for example, the camera 115. The input image 125 may include a body portion 140 and background portion 145. The body portion 140 may include pixels of the input image 125 representing the body of the user 130 in the input image. In some other embodiments, the image of the person can be stored in the memory of the computing device 105 or in a cloud-based computing resource to which the computing device 105 is communicatively connected.

In some embodiments of the disclosure, the computing device 105 can be configured to allow selecting a motion from a database of motions. The computing device 105 may further generate, based on the selected motion and the input image 125, a video 155. The video 155 may include images of the person 130 repeating the selected motion. The video 155 can be displayed using the graphical display system 120, stored in a memory of the computing device 105 or in a cloud-based computing resource to which the computing device 105 is communicatively connected. The computing device 105 can be configured to allow selecting a type of social media network and sharing the video 155 via the social media network.

Figure 2:
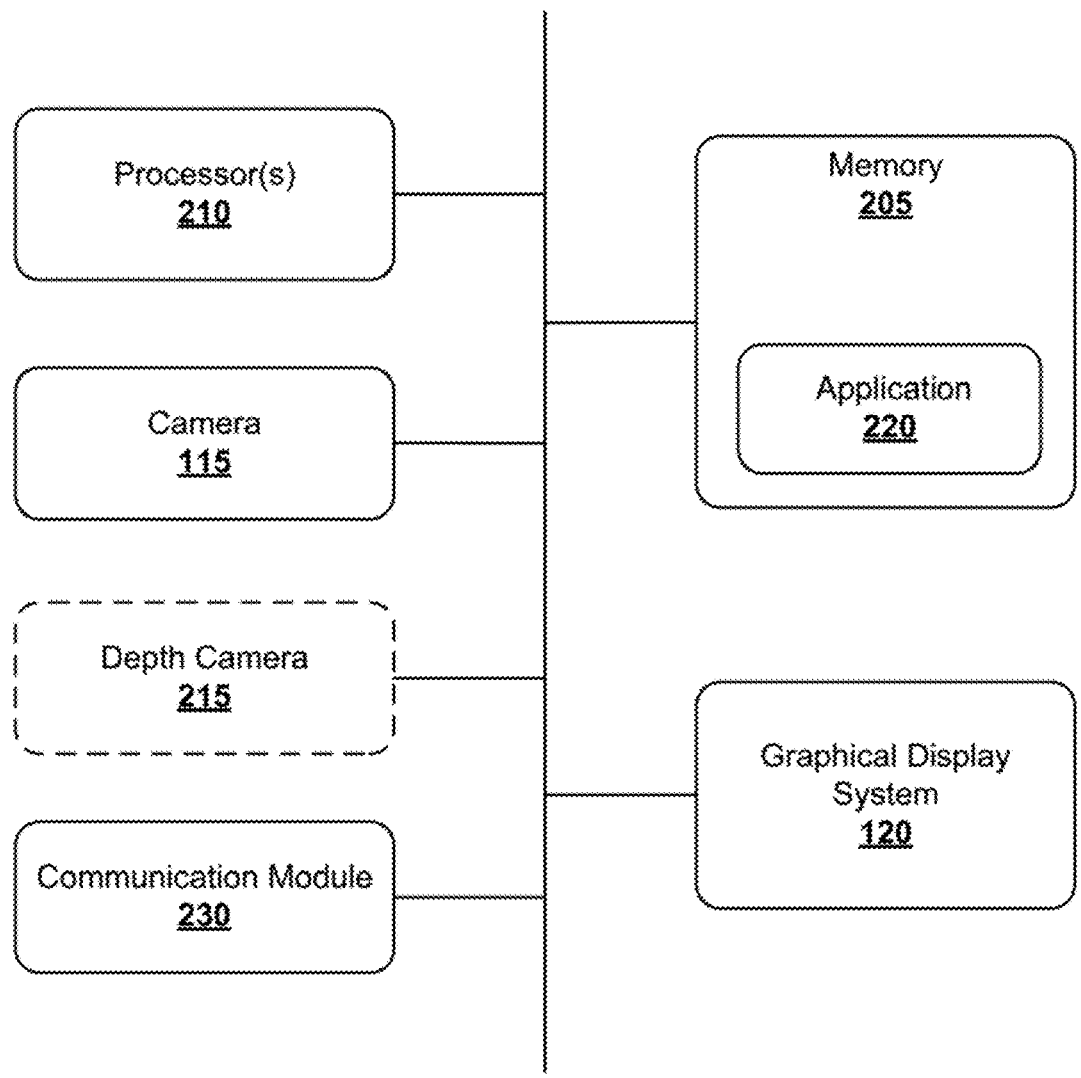
FIG. 2 is a block diagram showing an example computing device for implementing a method for animating a single image of a human body and applying effects, according to some embodiments.

In the example shown in FIG. 2, the computing device 105 may include both hardware components and software components. Particularly, the computing device 105 may include the camera 115 and an optional depth camera 215 to acquire digital images. The computing device 105 can further include one or more processor(s) 210 and a memory 205 for storing software components and processor-readable (machine-readable) instructions or codes, which when performed by the processor(s) 210, cause the computing device 105 to perform at least some steps of methods for animating a single image of a human body and applying effects as described herein. In some embodiments, the memory 205 may include an application 220 for single image-based animating of a person and applying effects. In some embodiments, the processor(s) 210 may include an image processor (for example, a graphical processing unit).

The graphical display system 120 can be configured to provide a user graphical interface. In some embodiments, a touch screen associated with the graphical display system 120 can be utilized to receive an input from a user. The options can be provided to a user via an icon or text buttons once the user touches the screen.

Communication module 230 may include modules operable to communicate data between computing device 105 and remote computing resource(s) via a data network. The remote computing resource(s) may provide access to one or more social media networks. In various embodiments, the communication module 230 may include a Bluetooth™ module, Infrared (IR) module, Wi-Fi module, and the like.

Figure 3:
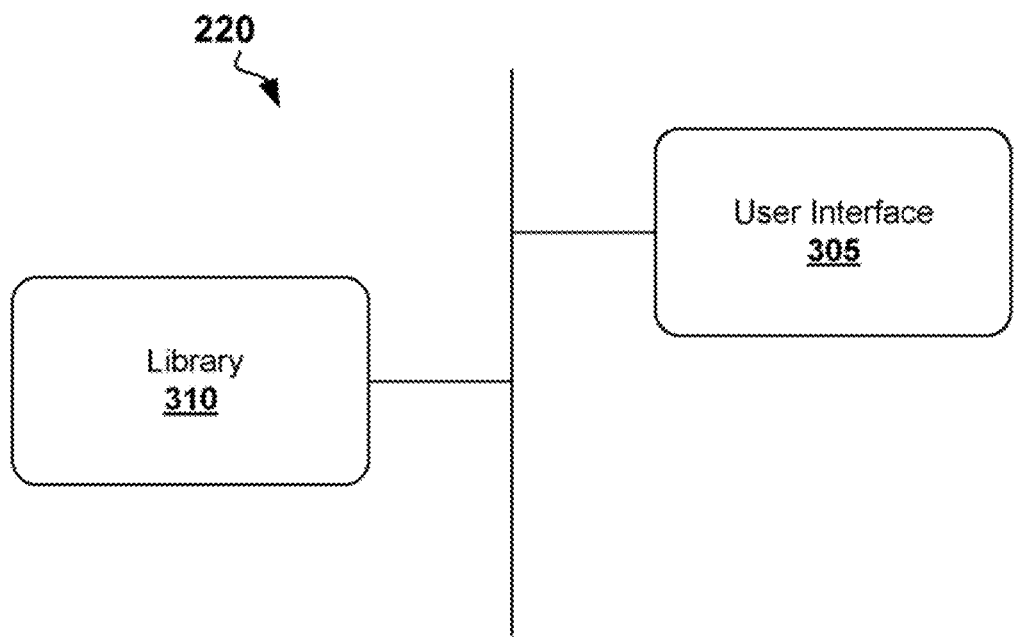
FIG. 3 is a block diagram showing modules of an application for single image-based animation of a person and applying effects, according to some example embodiments.

FIG. 3 is a block diagram showing module of the application 220 for single image-based animating of a person and applying effects, according to some example embodiments. The application 220 may include a library 310 including modules for animating a single image of a human body and applying effects and a user interface 305 for interaction with user.

Figure 4:
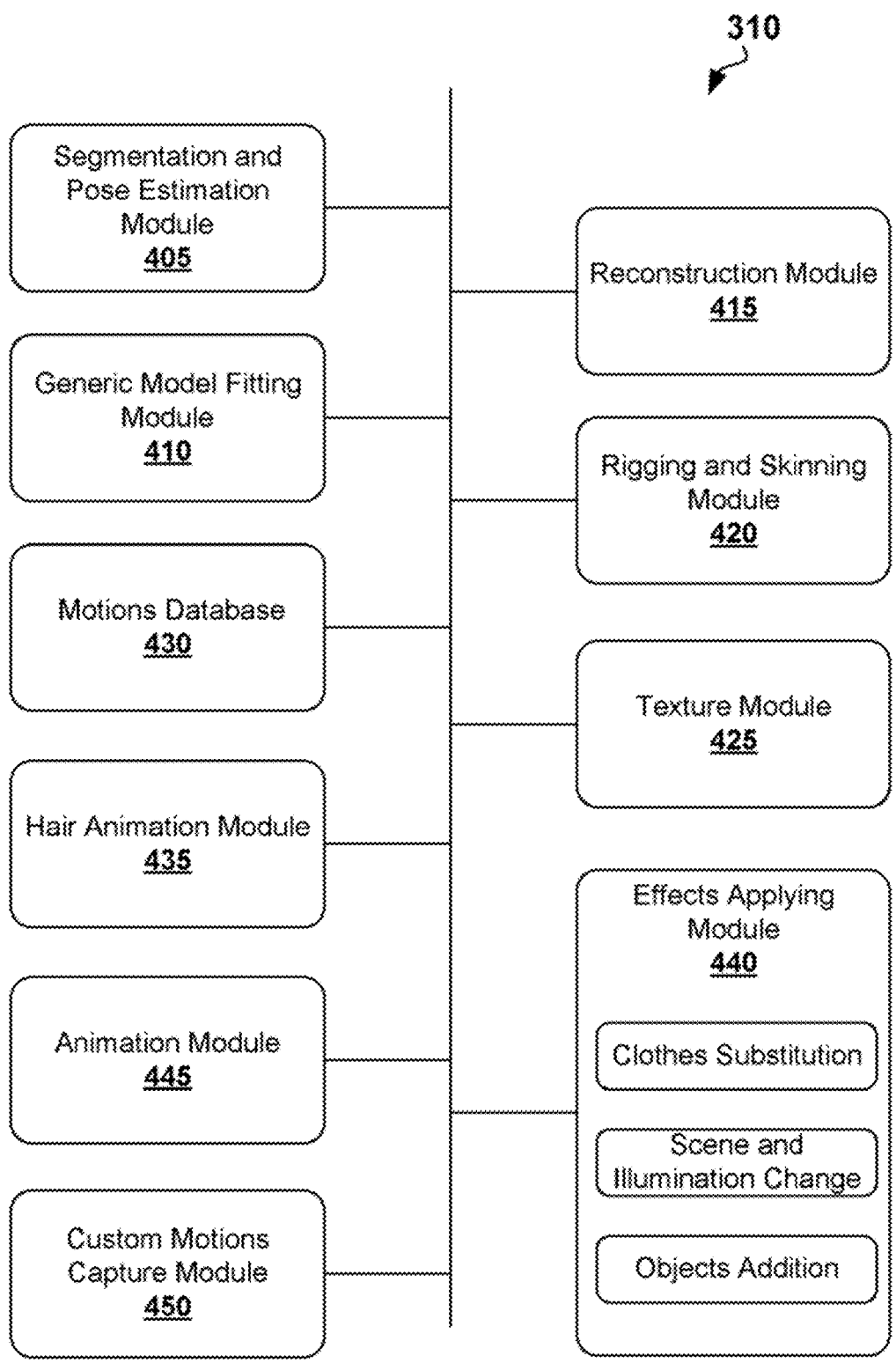
FIG. 4 is a block diagram showing modules of the library for animating a single image of a human body and applying effects, in accordance with an example embodiment.

FIG. 4 is a block diagram showing modules of the library 310 for animating a single image of a human body and applying effects, in accordance with an example embodiment. The library 310 may include a segmentation and pose estimation module 405, a generic model fitting module 410, a reconstruction module 415, a rigging and skinning module 420, a texture module 425, a motions database 430, and an animation module 445. The modules 405, 410, 415, 420, 425, 430, and 435 are described in detail in U.S. application Ser. No. 16/434,185, incorporated herein as reference in its entirety. The library 310 may further include a hair animation module 435, custom motions capture module 450, and an effects applying module 440.

The segmentation and pose estimation module 405 can be configured to receive the input image 125. The input image 125 may include pixels representing an image of the body portion 140 of a person. The segmentation and pose estimation module 405 can be configured to generate a segmentation mask. The segmentation mask can be an image showing a silhouette of the person on the input image 125. The segmentation mask can be further provided to the reconstruction module 415 and the texture module 425.

The segmentation and pose estimation module 405 may also determine, based on the input image 125, a pose of the body in the input image 125. The pose can be determined in a form of a graph. The graph may include a set of key points and edges connecting some of the key points.

The generic model fitting module 410 can be configured to generate a generic model based on the input image and the graph of the key points. The generic model may represent a general person's appearance and a pose of the person. The generic model may include shape parameters. The shape parameters may include a vector of 3D points representing the shape of the person's body. The generic model may further include a vector of pose parameters, wherein each of the pose parameters determines axis-angle rotations of at least one of the joints of the body. The joints of the body can correspond to the key points in the graph of the key points. In some embodiments, the generic model can be used to generate a mesh representing the person's body.

A generic model can be designed to be sophisticated enough to encompass a vast variety of shapes of persons and poses. The generic model can also be not complicated in terms of computation. The generic model can be a parametrized function of a fixed zero model, shape parameters, and pose parameters. The generic mode can represent a variety of human bodies of different shapes and poses that a real person can perform. Representing the generic model as a parameterized function can allow saving memory of the computing device and may allow computing motions with the use of optimized matrix calculations to increase a speed of computations.

In some embodiments, the parameters learned by the generic model may include skinning weights, shape coefficients, pose parameters, and joint regressors. Skinning weights may represent values used to determine how each joint affects each vertex of a mesh associated with the generic model. The mesh may represent a shape of the body of the person. The skinning weights can be used to animate the mesh. The skinning weights can be represented by a $N_{joints} \times N_{vertices}$ matrix, wherein $N_{joints}$ is a number of joints and $N_{vertices}$ is a number of vertices in the mesh. Shape coefficients may be used to alter an initial generic model using the shape parameters in order to make the generic model appropriately shaped in terms of height, weight, waist circumference, low hip girth, and so forth. Joint regressors may include values used to determine initial positions of joints of the person with respect to the shape of the person. The joint regressor can be represented by a matrix similar to the matrix for the skinning weights. After training, the generic model may generate a shape and a pose of a human body based on a set of shape parameters and a set of pose parameters. The generic model can be fitted to the input image 125 using a neural network. The generic model can be provided to the reconstruction module 415.

The reconstruction module 415 can be configured to generate, based on the generic model and a segmentation mask, a 3D model to be used in animation. The generic model can describe a limited space of human shapes. The generic model may not represent clothes, hair, and other specific details of person. The generic model can be used to create the 3D model. The 3D model may depict as many as possible details of a specific person's shape. Specifically, the 3D model can be constructed to fit substantially exactly a silhouette of a person in the input image. In other words, the 3D model can be constructed to cover a silhouette in the segmentation mask. In further embodiments, the 3D model can be constructed to cover hair and clothes on the input image to make the animation of the 3D model look realistic.

The 3D model may include a skeleton represented by a set of joint points in 3D space. The joint points may indicate locations of joints in the body. The skeleton can be built by professional 3D riggers and animators. The skeleton may allow to support a wide range motions, capturing all the subtleties in the motions. The skeleton may include more points than a graph of key points of the generic model generated in generic model fitting module 410. For example, the skeleton may include joint points in the area of backbone and limbs and especially palms. As a result, the skeleton may allow expressing more sophisticated movements than the graph of key points of the generic model.

Figure 5:
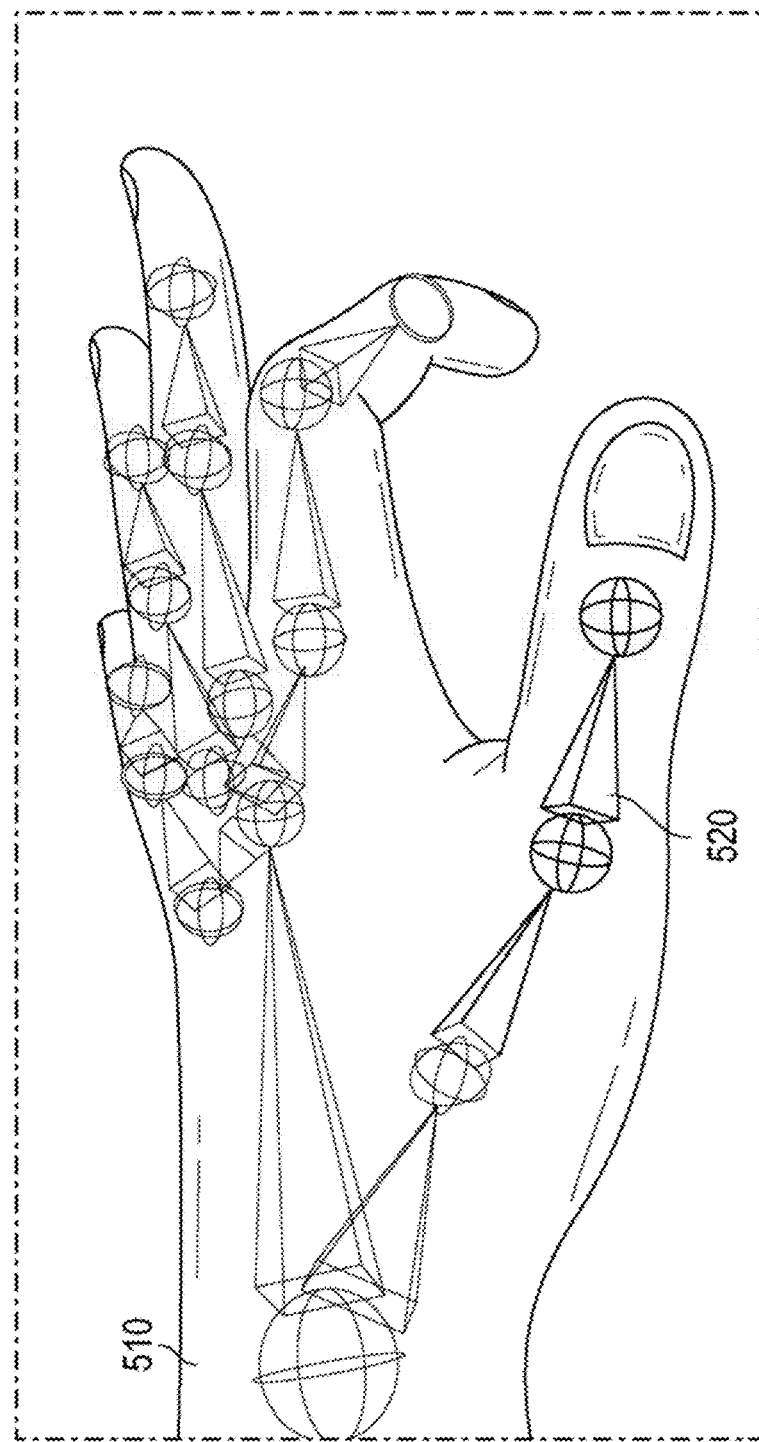
FIG. 5 shows a part of a skeleton including joint points representing a hand 510, according to an example embodiment.

FIG. 5 shows a part of a skeleton 520 including joint points representing a hand 510, according to an example embodiment.

Referring back to FIG. 4, the reconstruction module 415 may further generate a reconstructed mesh based on the 3D model. The reconstructed mesh may include 3D points different from 3D points of a mesh of the generic model. Each of the points of the reconstructed mesh can be assigned a set of skinning weights. Each of the skinning weights can be associated with at least one of the joint points. The 3D model may be further used to generate a texture on the reconstructed mesh.

The rigging and skinning module 420 can determine skinning weights for vertices in the reconstructed mesh generated by the reconstruction module 415. The skinning weights and locations of joint points can be further used to animate the mesh.

The texture module 425 can generate a texture map for the reconstructed mesh. The texture map can be generated using the input image and the segmentation mask. The generation of the texture map may include UV unwrapping of the reconstructed mesh to obtain a UV texture map. The texture map can be designed in a such a way that all other reconstructed meshes have the same UV texture map even if the other reconstruction meshes differ by silhouette, number of vertices, and faces. This may allow to transfer a texture from one reconstructed mesh generated for an input image and a segmentation mask to another reconstructed mesh generated for the same input image and the same segmentation mask. This may also allow to modify a texture map to change, for example, color and clothes in the input image.

UV unwrapping can be defined as a process of flattening a surface of a 3D object to a 2D surface. U and V are coordinates (also referred to as texture coordinates) of vertices of points on the 2D surface.

The animation module 445 can generate, based on a sequence of sets of pose parameters, frames of output video featuring a motion of person in the input image. The sequence of sets of pose parameters can be stored in a motion database 430. A sequence of the sets of pose parameters can represent at least one motion. Each set in the sequence of sets of pose parameters can be used to generate one frame of the output video. The sequences of the sets of pose parameters can be obtained using a motion capture of movements performed by real actors and digitizing the movements. In some embodiments, the capture of movements may include capturing movements of fingers of professionals with help of special gloves with sensors.

In some embodiments, the sequences of the sets of pose parameters can be artificially generated by a 3D motion designer operating with a generic model in editors. The motions database 430 may include different sequences of sets of pose parameters representing different pre-defined motions. The pre-defined motions may include dance, acrobatics, interaction with ambient scene and objects, and so forth Each frame of output video can be generated by recomputing the 3D model using a set of the pose parameters corresponding to a pose. As a result, new positions of vertices of the reconstructed mesh in 3D space can be generated and textured using the texture map to generate an image of person's body adopting the pose. The image of the person's body can be inserted into the frame.

After the frames of the output video have been generated, the output video can be displayed using a graphical display system. In some embodiments, playing the output video can start when the output video is not completely generated. Each frame that is fully rendered by that time can be shown before the completion of rendering the rest frames of the output video. This may decrease user waiting time.

The effects applying module 440 may apply one or more effects to the frames of the output video. The effects may be applied to the frames while the video is generated by the animation module 445. The effects may include, for example, substitution clothes of person in the input image, change of scene and illumination of the scene, addition of another object in the scene, and so forth. The effects can be selected via the user interface 305.

Applying effects, including for example, illumination, background substitution, clothes substitution, insertion of ambient objects can be performed using at least two methods. The first method may include rendering each frame in its entirety with the rendered image of the person's body and the background scene displaying the effects. The second method may include rendering images of the person's body separately from the images of the background scene displaying the effects. Thereafter, the second method may proceed with overlaying the images of the person's body and the images of the background scenes with the effects to generate frames of the video. The second method may be preferable because it allows precomputing some parts of the scenes in the video and, consequently, generating complex and photorealistic scenes. However, the second method may require downloading preprocessed images to the computing device 105. The first method for generating the video does not require downloading, to the computing device 105, extra data and allows generating more interactions with the background scene than the second method. However, the first method is more computationally expensive and time-consuming than the second method.

The custom motions capture module 450 may allow to record a video with a person performing a custom motion. The custom motions capture module 450 may further determine, based on the video, a sequence of sets of pose parameters corresponding to the custom motion of the person and add the sequence of the sets of pose parameters as a new motion in the motions database 430.

The hair animation module 435 can generate a hair model of the person in the input image and animate the hair model in frames of the output video. The hair model can be animated based on moves and rotations of the head of the person.

The hair animation module 435 may perform the following steps: classifying the hair type, modifying appearance of the hair, cutting the hair, and animating the hair. Animation of the hair is important for cases when the hair is not fully inside the input image of the person.

Classification of the hair may include determining the following hair types: "straight," "wavy," "curly," "long," and "short." The classification is needed for selection of the hair style and physical parameters of the hair. A user interface may allow a user to modify a hair color and a hair type. Change of the hair color and hair type can be carried out by adjusting the color statistics or selecting another texture for the hair. For long hair, a hair volume can be increased by using warping transformation to make the hair look more attractive.

For a better visual hair appearance during animation, the hair should not have any shape artifacts, like detaching of individual strands, segmentation errors, or hair overlapping with other objects or the input images borders. The hair can be cut by fitting a reference mask to avoid the shape artifacts.

Figure 6:
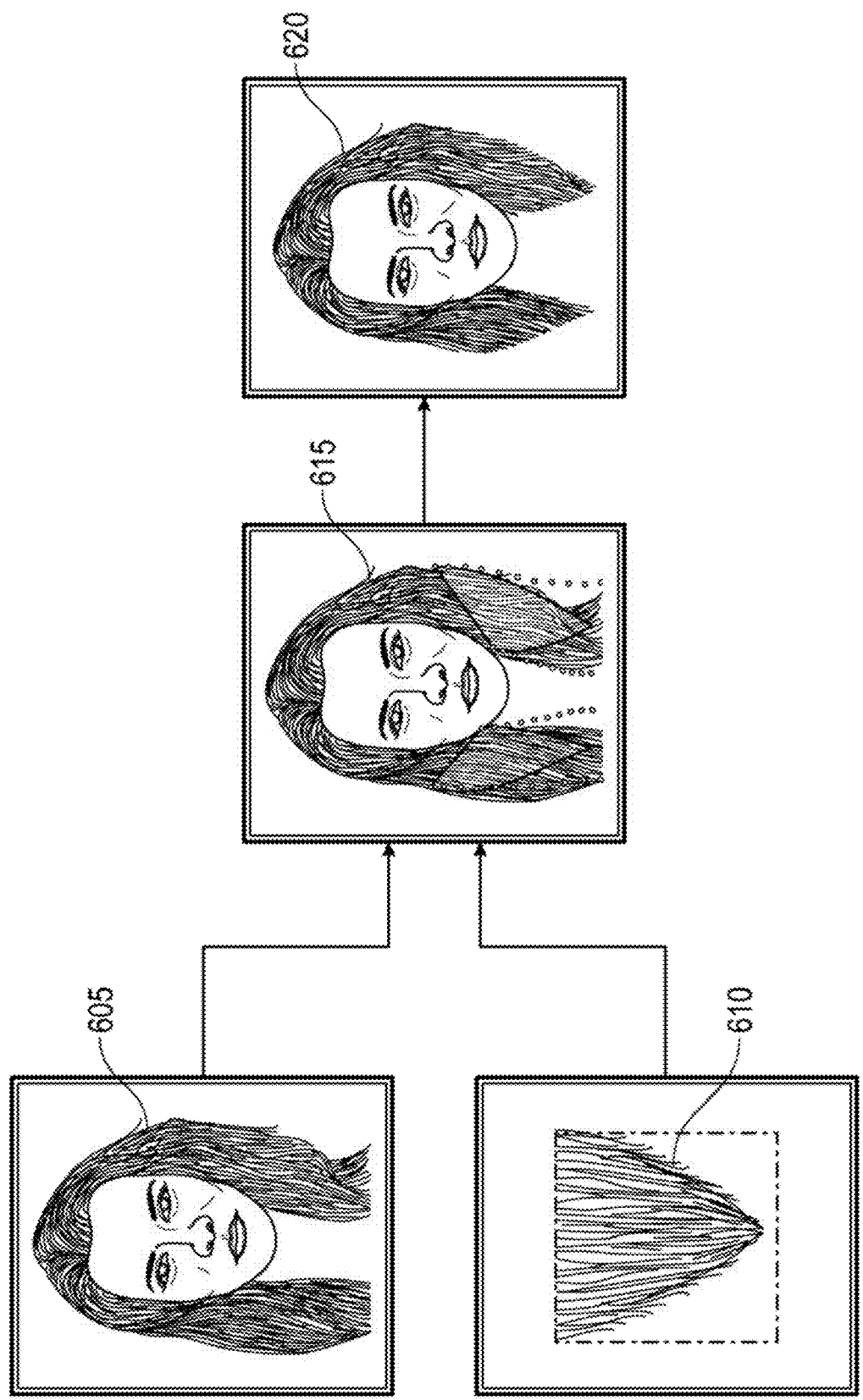
FIG. 6 shows an input image, a hair mask, an image of the hair mask warped to the input image, and an image of the hair mask applied to the input image.

FIG. 6 shows an input image 605, a hair mask 610, an image 615 of the hair mask warped to the input image 605, and an image of 620 of the hair mask 610 applied to the input image 605, according to an example embodiment.

A suitable mask for the user's hair type can be selected from a prepared collection. The selected mask can be then warped to adjust the hair on the input image. The hair can be also transformed to look more symmetrical. A user may select another hair style to make hair longer or shorter, or cut or warp the hair to another shape. For animation of the hair, a triangle mesh and a set of control points can be used for animation of the hair model.

Figure 7:
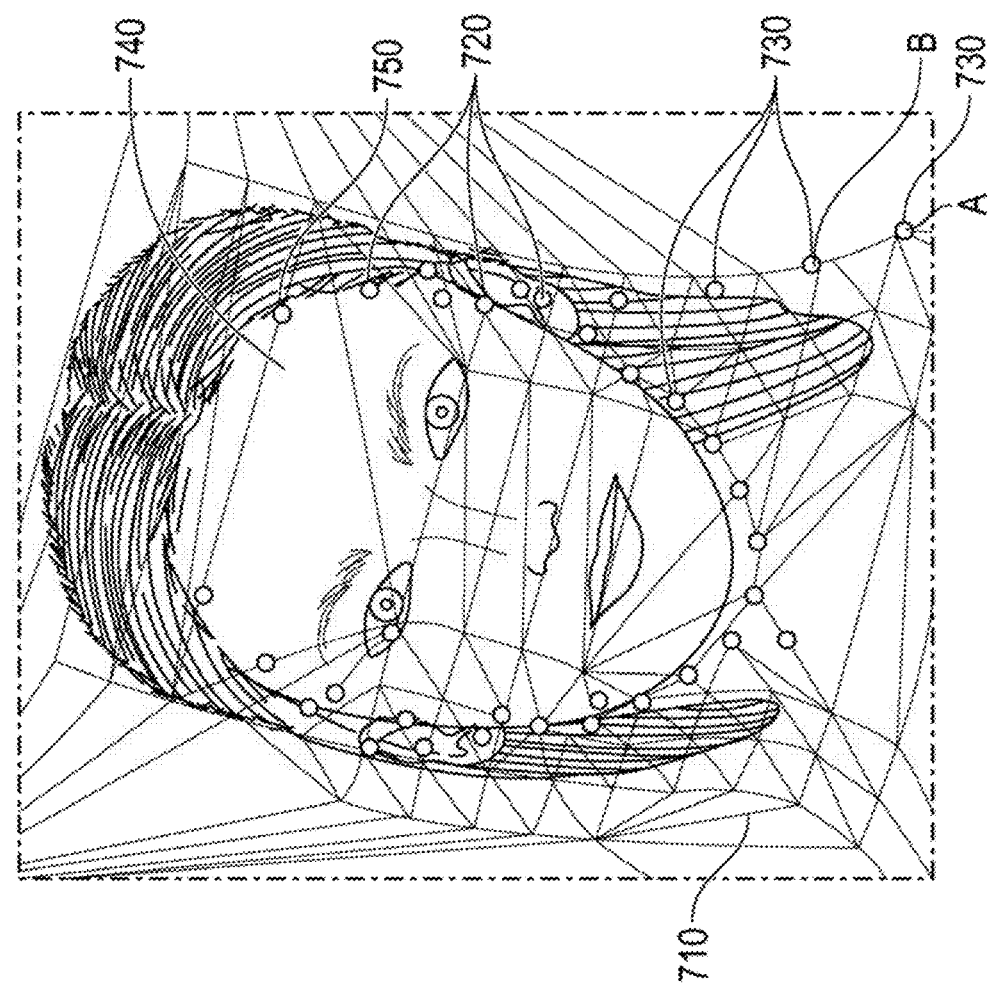
FIG. 7 shows an example triangle mesh and an example set of control points, according to an example embodiment

FIG. 7 shows an example triangle mesh 710 and an example set of control points, according to an example embodiment. The movement of control points can be calculated based on movement of head 740 using a custom physics engine. The control points may include fixed control points 720 and mobile control points 730. The fixed control points 720 can be placed on the boundary of the face to prevent the hair near the face from moving too much. The mobile control points 730 can be placed on the hair. The mobile control points 730 may be used as an input for hair animation.

The placement of the mobile control points 730 and relative positions of the mobile control points 730 with respect to each other and to the fixed control points 720 may depend on the hair style. For typical long straight hair, the mobile control points 730 can be placed on the hair strands and bound to each other in a chain. A root control point 750 can be bound to the head. For other hair styles the mobile control points 730 can be placed differently. The mobile control points 730 can be placed in a special way to create sophisticated effects. The sophisticated effects may include an effect of hair blowing in a wind.

During animation, each of the mobile control points 730 moves towards its most suitable position relative to its parent control point. The parent control point of a mobile control point A is a mobile control point B from the chain such that the mobile control point B is located closer to the head then the mobile control point A. The most suitable position of the mobile control points 730 can be affected by set parameters of gravity vector and hair length. A vector of movement of the control points is affected by the most suitable position and a set parameters of stored speed proportion, acceleration factor, and hair length compression.

When the head 740 is moving or rotating, the root control points 750 are moving with the head 740 because the root control points 750 are fixed at the head. Positions of the root control points 750 determine changes of most suitable positions of all other mobile control points 730 in the chain. Each of the points of the triangle mesh 710 is, in turn, moving based on moving of the mobile control points. Thus, moving of the mobile control points 730 launches the hair animation.

The final hair image for frame can be obtained by warping the hair image using the resulting mesh. A user interface may allow users to alter physical parameters in scenarios to create different effects like wind, zero gravity, or wet hair effect. Another option for customizing hair animation is creating virtual head movements. During animation, the hair can follow the virtual head movements, while the visual head position is not changed. This effect can be useful for generating videos wherein the hair shakes faster or slower than the head.

Figure 8:
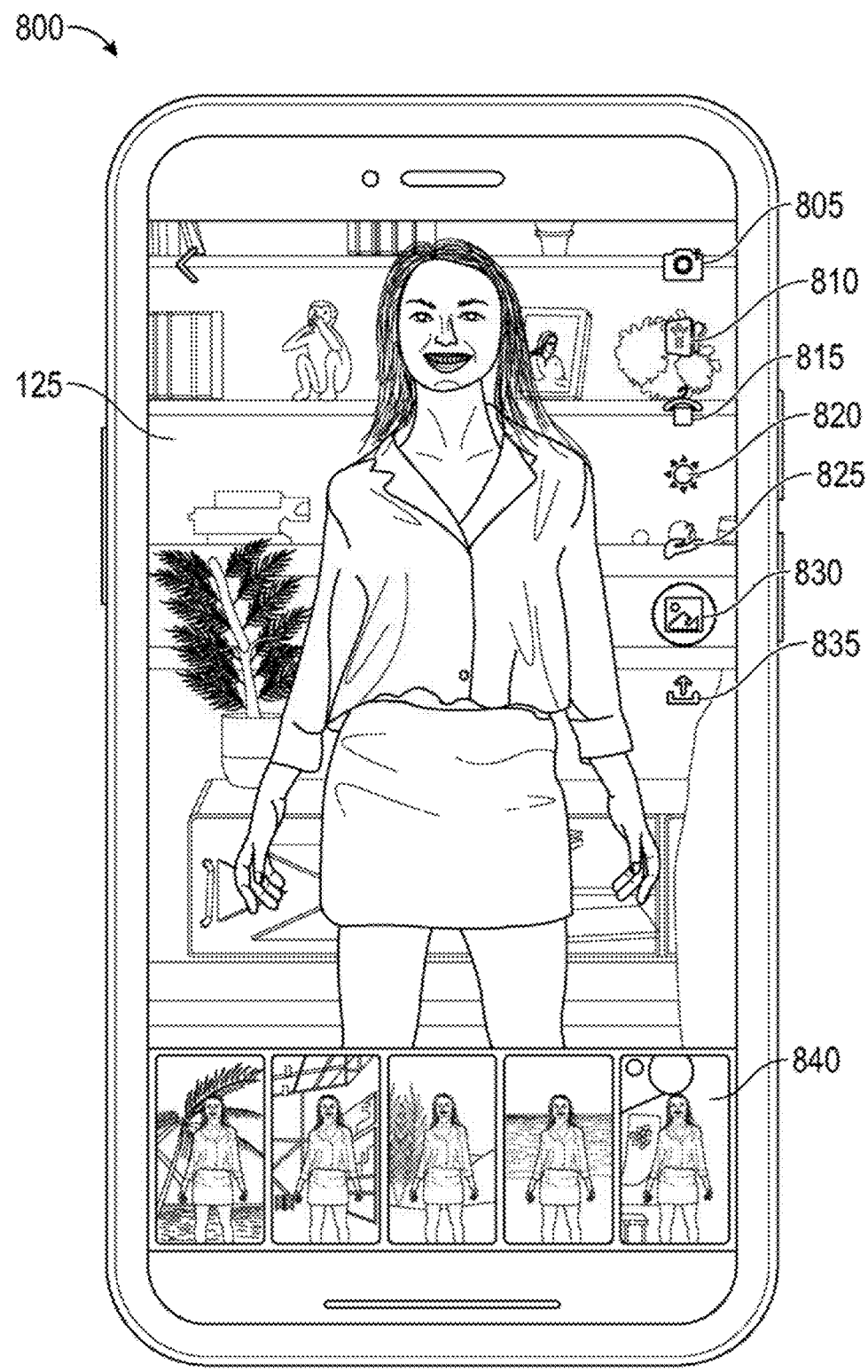
FIGS. 8-12B show screens of an example user interface of an application for animating a single image of a person and applying effects, according to some example embodiments.

FIG. 8 shows a screen 800 of an example user interface of the application 220, according to an example embodiment. The screen 800 includes an input image 125 of a person to be animated, a camera icon 805, a motion selection icon 810, a clothes selection icon 815, an illumination settings icon 820, an icon 825 for selecting an object, a background (scene) selection icon 830, and a video export icon 835.

The user interface may allow a user to take a photograph by selecting the camera icon 805. The photograph can be used to create a new 3D model for animation. Alternatively, the user interface may also allow the user to select one of existing 3D models that were generated based on photographs taken before and saved by the application 220 in the memory of the computing device 105.

In example of FIG. 8, the background (scene) selection icon 830 is selected. The user interface provides a list 840 of backgrounds (scenes). Each of scenes can be presented in the user interface in a form of a little image snippet or a short video. A user may select a scene for rendering video. The scene may include a background and, optionally, some surrounding objects. The user may select generating a video with the same background as that in the input image 125. The user interface may also allow the user to add custom scenes by uploading or making photos that will be used as a background.

The user interface may further also allow selecting settings via a clothes selection icon 815, illumination settings icon 820, icon 825 for selecting an object in a hand, and a background (scene) selection icon 830. Then the user interface may call modules of the library 310 to generate and process frames of the output video based on the selected settings.

Figure 9:
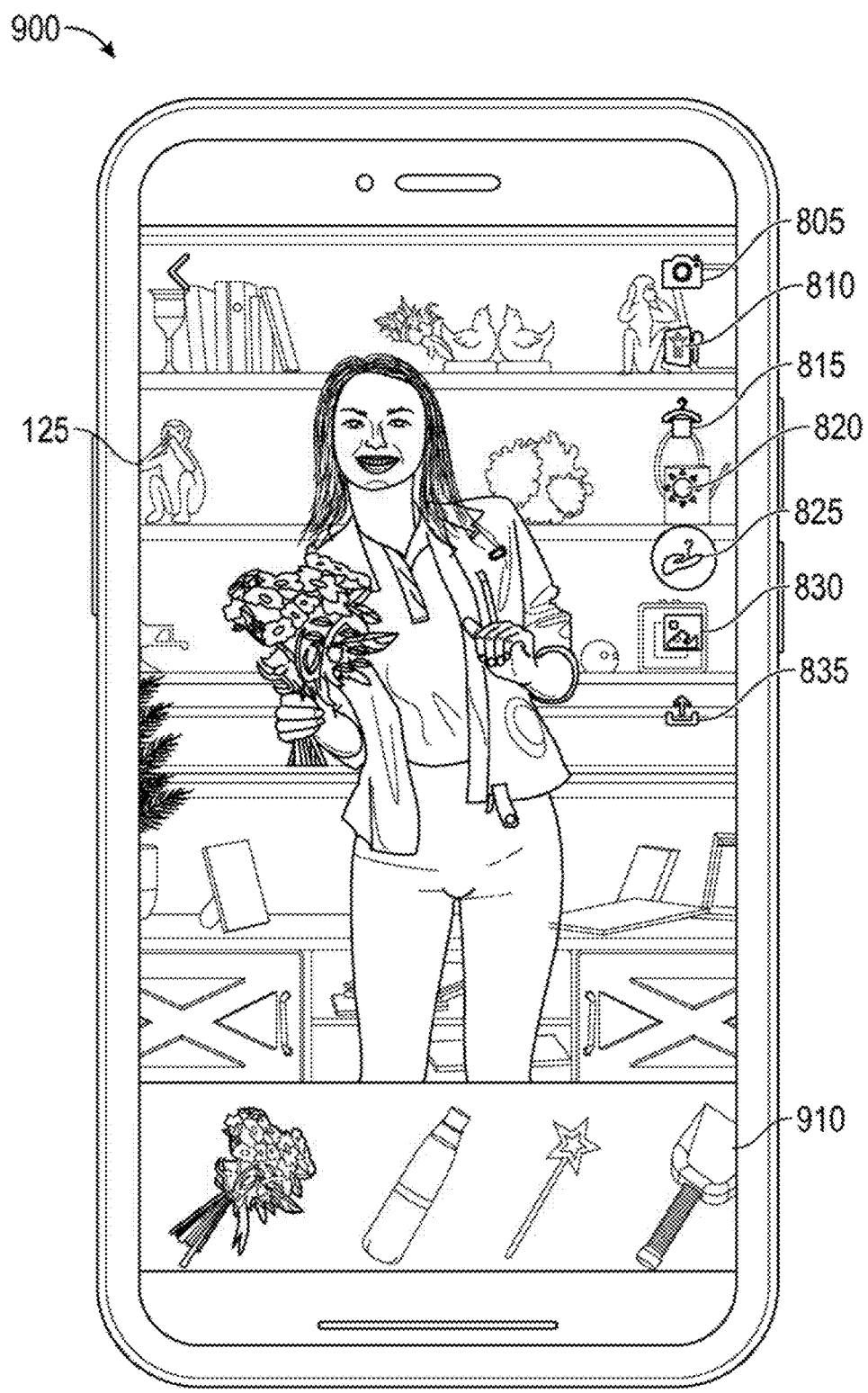

FIG. 9 shows a screen 900 of an example user interface of the application 220, according to an example embodiment. The screen 900 includes an input image 125 of a person to be animated, a camera icon 805, a motion selection icon 810, a clothes selection icon 815, an illumination settings icon 820, an icon 825 for selecting an object, a background (scene) selection icon 830, and a video export icon 835.

In example of FIG. 9, the icon 825 for selecting an object is selected. The user interface provides list 910 of objects that can be added to a hand of the model of the person during generation of frames of output video featuring the person performing selected motion. Each of the objects can be presented in the user interface in a form a little image snippet.

In frames of generated video, the object can be added to a hand of the person performing a motion. The object can be inserted in the hand in a way that looks natural. In some embodiments, the frames may feature a person operating with other objects in an ambient scene. For example, the frames may feature a person fighting with a laser sword. Insertion of the objects can be carried out by building a holistic 3D scene in which the model of person is placed while performing dance or another motion, and then the whole scene is rendered.

Figure 10:
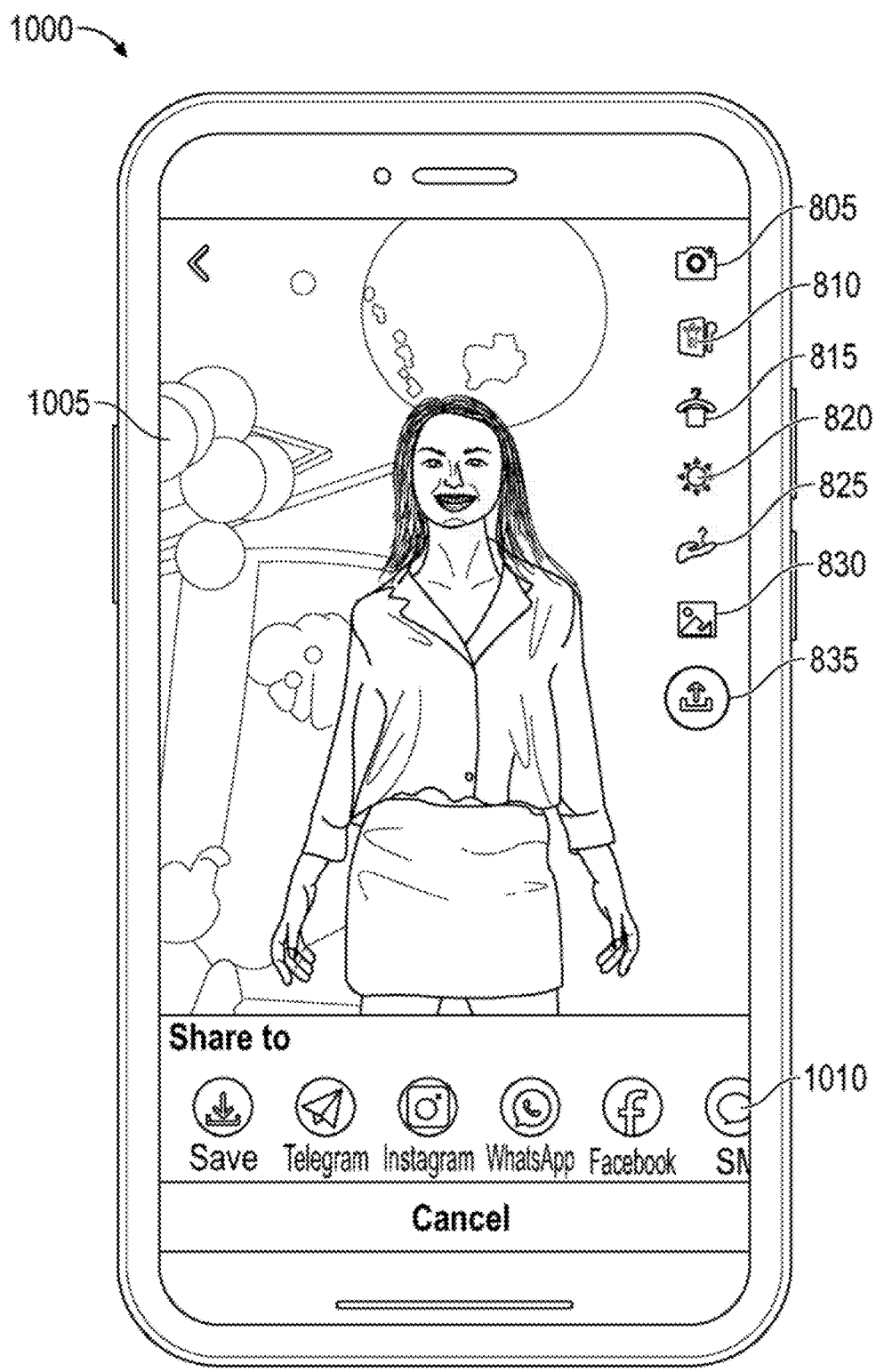

FIG. 10 shows a screen 1000 of example user interface of the application 220, according to an example embodiment. The screen 1000 includes a frame 1005 of generated output video, a camera icon 805, a motion selection icon 810, a clothes selection icon 815, an illumination settings icon 820, an icon 825 for selecting an object, a background (scene) selection icon 830, and a video export icon 835. In example of FIG. 10, the video export icon 835 is selected. The user interface provides a list 1010 of options for saving the video or sharing the video via social media network.

The social media network can be one of the social media networks currently available on the market. However, it should be obvious to those skilled in the art, that application 220 shown in FIG. 2 and FIG. 3 can be implemented in as a stand-alone social media platform for generating and sharing the videos, scenarios, custom movements, custom background scenes, custom effects for scene illumination, clothes, and hairstyles, background and messages, and so forth.

Figure 11:
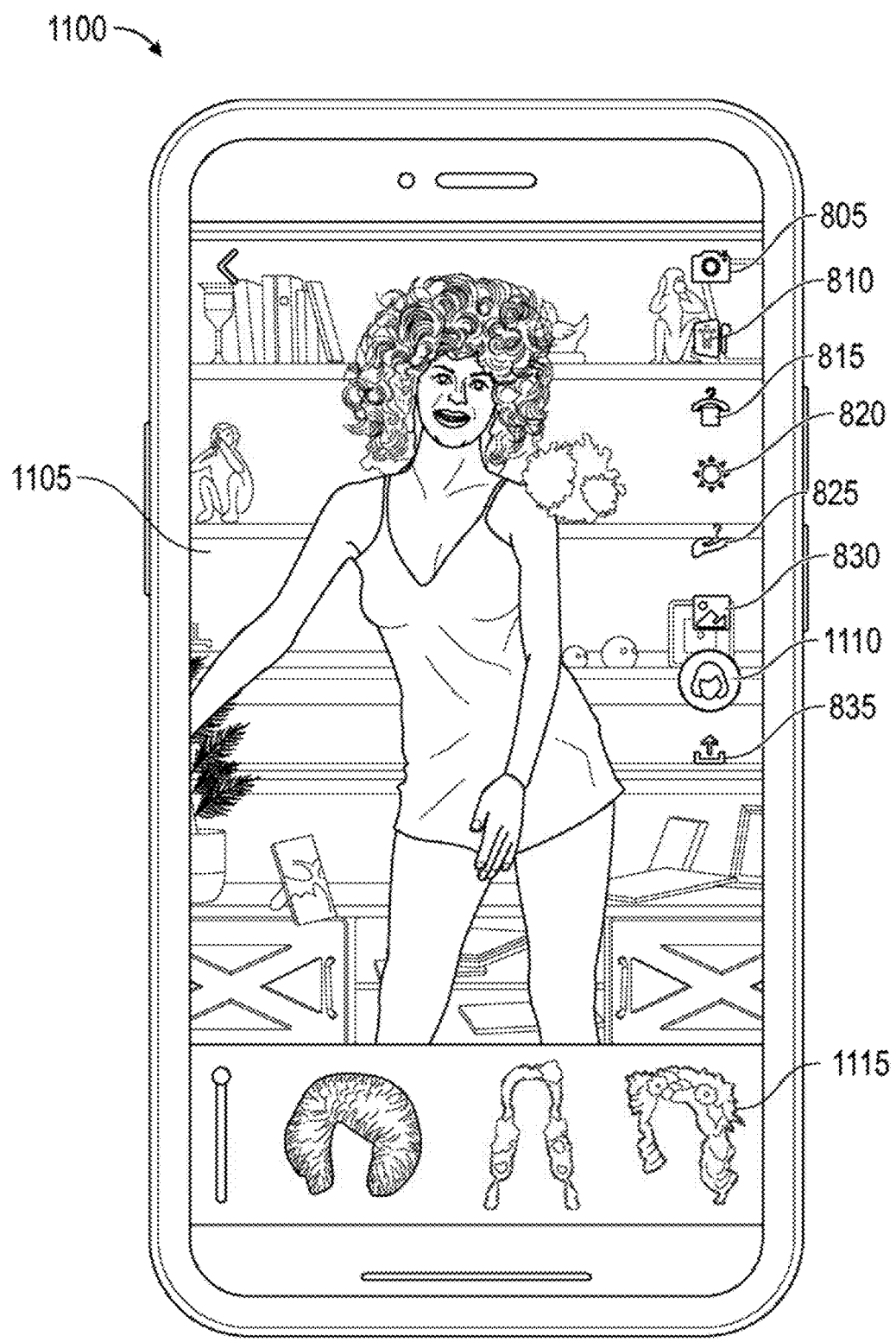

FIG. 11 shows a screen 1100 of example user interface of the application 220, according to an example embodiment. The screen 1100 includes a frame 1105 of generated output video, a camera icon 805, a motion selection icon 810, a clothes selection icon 815, an illumination settings icon 820, an icon 825 for selecting an object, a background (scene) selection icon 830, a video export icon 835, and a hair style selection icon 1110. In example of FIG. 11, the hair style selection icon 1110 is selected. The user interface provides a list 1115 of options for selecting a hair style for the model of the person in the video. The frame 1105 also shows that clothes of person are substituted with other clothes selected by a user. Also, illumination effects and dynamics are added to the frames of the output video.

The user interface may allow a user to substitute clothes that a person is wearing in the input image with any other clothes or costumes from a collection. The options for changing the clothes is provided via clothes selection icon 815. The collection of clothes may include conventional clothes, a costume of an Ironman, a Santa Claus, and so forth. The user may select appropriate clothes for the selected scene or selected motion scenario. The substitution of clothes can be carried out by changing a texture map in texture module 425 described in FIG. 4. The option for changing clothes can be used as a virtual wardrobe; that is, the user can choose and check whether a particular garment fits the model of the person in video.

The frame 1105 also shows that the illumination on the scene is changed and dynamics are added to the video. The user interface may allow a user to select an effect for illumination and dynamics from a collection of pre-defined effects. The options for selecting an effect for illumination and dynamics can be provided via the illumination settings icon 820.

Selecting an appropriate illumination effect may allow to generate video featuring the scene taking place in twilight or a disco lightning while the person performs dances. This effect can be achieved with appropriate adjustments of renderer by setting points of light and intensities of the light for each frame in the output video. Also, by applying adjustments to the renderer, a position of camera can be changed for each frame to add an effect of dynamicity to the animation.

Figure 12B:
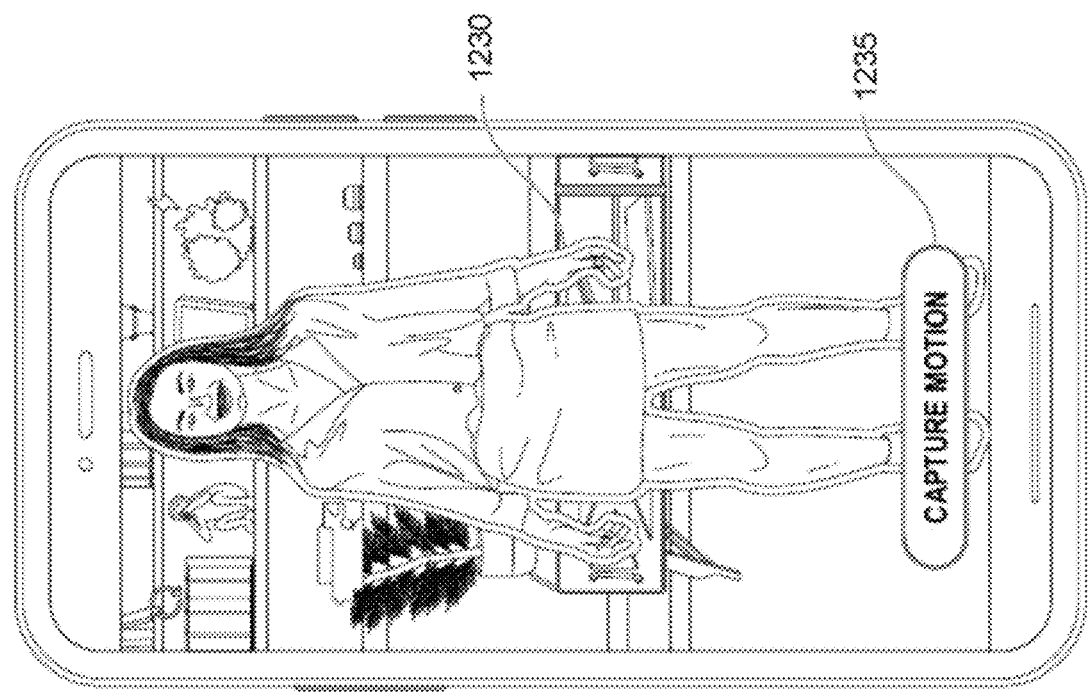
Figure 12A:
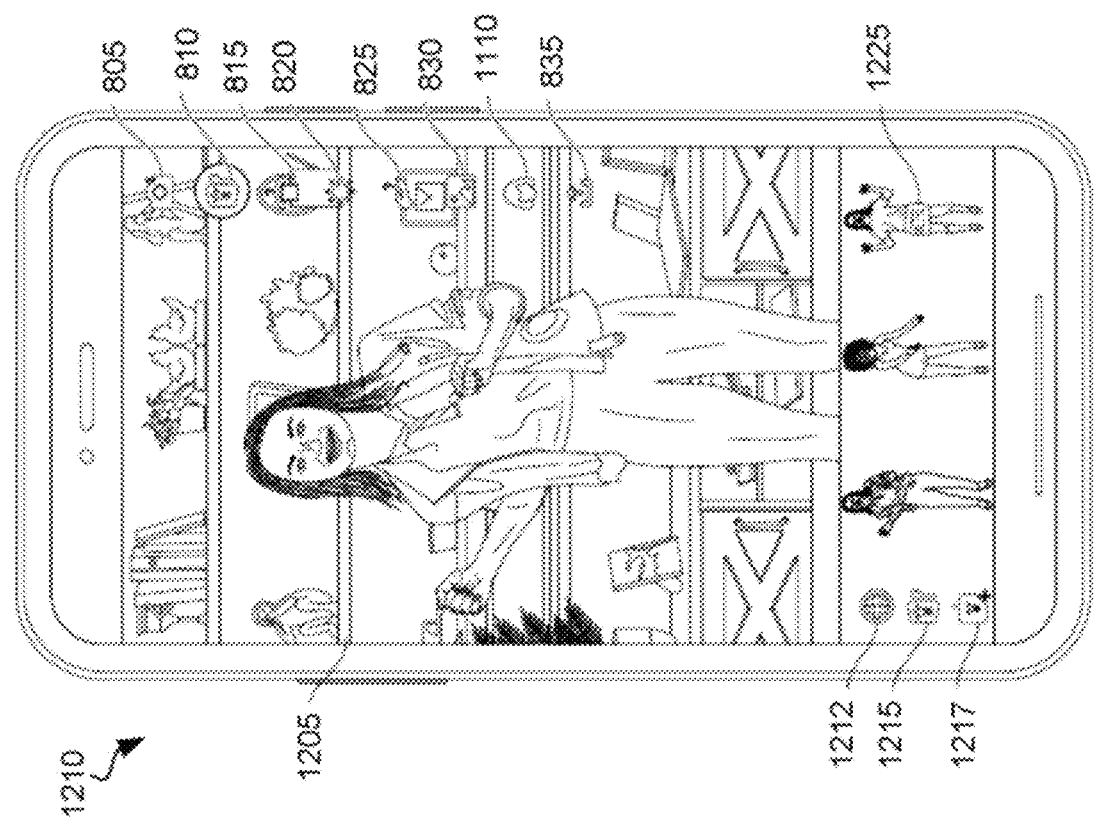

FIG. 12A shows a screen 1210 of example user interface of the application 220, according to an example embodiment. The screen 1210 includes a frame 1205 of generated output video, a camera icon 805, a motion selection icon 810, a clothes selection icon 815, an illumination settings icon 820, an icon 825 for selecting an object in a hand, a background (scene) selection icon 830, a video export icon 835, and a hair style selection icon 1110.

In example of FIG. 12A, the motion selection icon 810 is selected. The user interface provides additional options to browse motions via icon 1212, select motion via icon 1215, and capture custom motion via icon 1217. The user interface also provides a list 1225 of pre-determined motions from the motions database 430 shown in FIG. 4.

FIG. 12B shows a screen 1220 of example user interface of the application 220, according to an example embodiment. The application 220 includes custom motions capture module 450 (shown in FIG. 4) allowing the user interface to capture custom motion. The custom motions capture motion 450 may determine boundaries of silhouette 1230 of the person in the image captured by a camera of the computing device. Then a user can touch "capture motion" button 1235 to record video of the person performing the custom motions. The custom motions capture module 450 may further determine a sequence of sets of pose parameters corresponding to the custom motion and add the sequence of sets of pose parameters to the motion database 430 as a new motion. The user may further use the new motion for animating different input images (that is, apply them to different models) the same way as other pre-defined motions in the motions database. The new motion can be shared (for example, via social media networks) with other users, so the other users may apply the new motion to their input mages.

Figure 13:
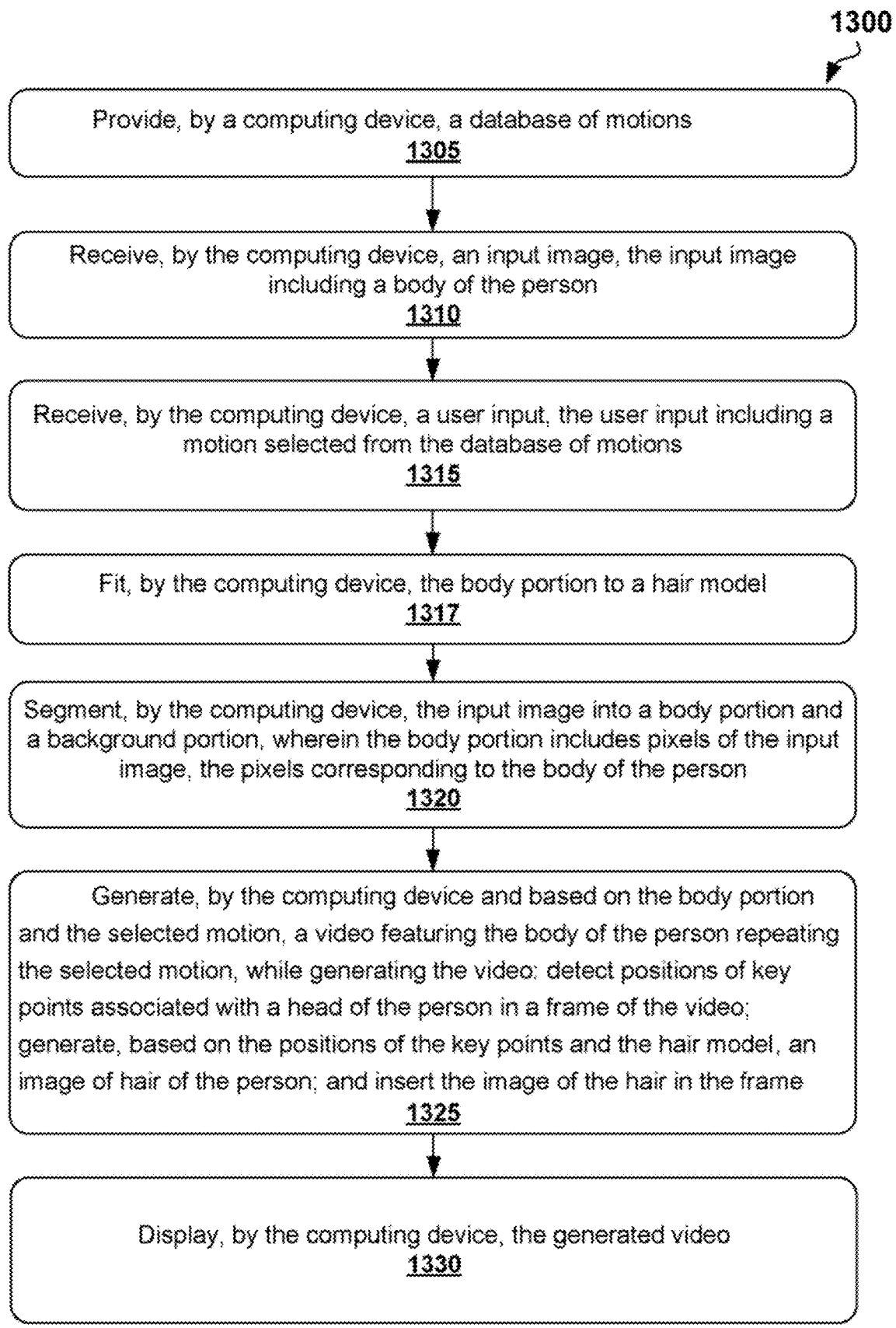
FIG. 13 is a flow chart showing a method for animating a single image of a human body and applying effects, according to one example embodiment.

FIG. 13 is a flow chart showing a method 1300 for animating a single image of a human body and applying effects, according to one example embodiment. The method 1300 can be performed by computing device 105.

The method 1300 may commence, in block 1305, with providing, by a computer device, a database of motions.

In block 1310, the method 1300 may include receiving, by a computing device, an input image, the input image including a body of the person.

In block 1315, the method 1300 may include receiving, by the computing device, a user input, the user input including a motion selected from the database of motions.

In block 1317, the method 1300 may include fitting the body portion to a hair model. In block 1320, the method 1300 may include segmenting, by the computing device, the input image into a body portion and a background portion. The body portion may include pixels corresponding to the body of the person.

In block 1325, the method 1300 may include generating, by the computing device and based on the body portion and the selected motion, a video featuring the body of the person repeating the selected motion. While generating the video, positions of key points associated with a head of the person may be detected in a frame of the video. Based on the positions of the key points and the hair model, an image of hair of the person maybe generated. The image of the hair may be inserted in the frame. Generating the video may include generating, based on the body portion, a 3D model of the body of the person and rendering the 3D model based on a sequence of pose parameters. The sequence of the pose parameters is defined by the selected motion.

In block 1330, the method 1300 may include displaying, by the computing device, the generated video.

Figure 14:
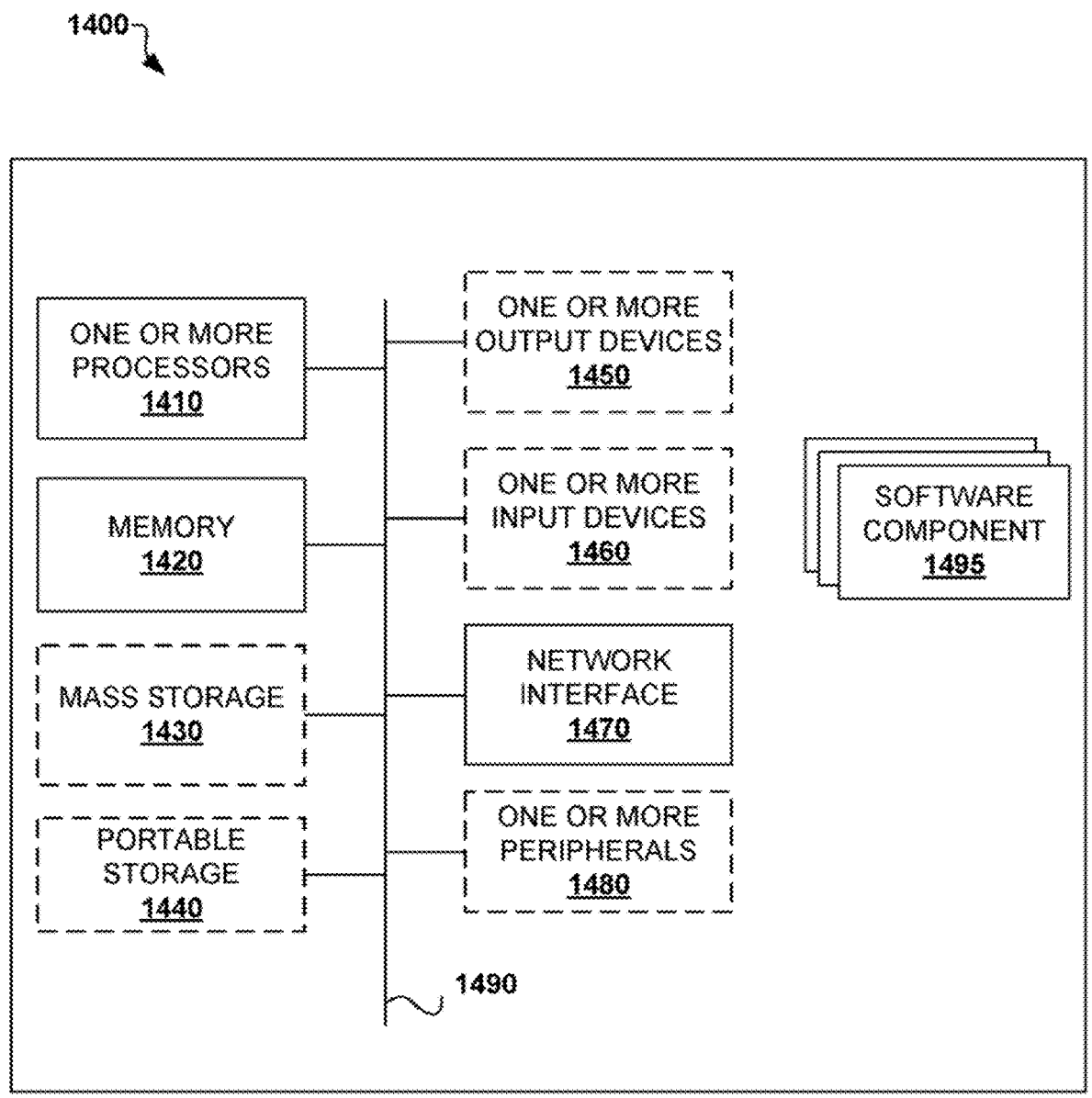
FIG. 14 illustrates an example computing system that may be used to implement methods described herein.

FIG. 14 illustrates an example computing system 1400 that may be used to implement methods described herein. The computing system 1400 may be implemented in the contexts of the likes of the computing device 105.

As shown in FIG. 14, the hardware components of the computing system 1400 may include one or more processors 1410 and memory 1420. Memory 1420 stores, in part, instructions and data for execution by processor 1410. Memory 1420 can store the executable code when the computing system 1400 is in operation. The computing system 1400 may further include an optional mass storage device 1430, optional portable storage medium drive(s) 1440, one or more optional output devices 1450, one or more optional input devices 1460, an optional network interface 1470, and one or more optional peripheral devices 1480. The computing system 1400 can also include one or more software components 1495 (e.g., ones that can implement the method for portrait animation as described herein).

The components shown in FIG. 14 are depicted as being connected via a single bus 1490. The components may be connected through one or more data transport means or data network. The processor 1410 and memory 1420 may be connected via a local microprocessor bus, and the mass storage device 1430, peripheral device(s) 1480, portable storage medium drive(s) 1440, and network interface 1470 may be connected via one or more input/output (I/O) buses.

The mass storage device 1430, which may be implemented with a magnetic disk drive, solid-state disk drive, or an optical disk drive, is a non-volatile storage device for storing data and instructions for use by the processor 1410. Mass storage device 1430 can store the system software (e.g., software components 1495) for implementing embodiments described herein.

Portable storage medium drive(s) 1440 operates in conjunction with a portable non-volatile storage medium, such as a compact disk (CD), or digital video disc (DVD), to input and output data and code to and from the computing system 1400. The system software (e.g., software components 1495) for implementing embodiments described herein may be stored on such a portable medium and input to the computing system 600 via the portable storage medium drive(s) 1440.

The optional input devices 1460 provide a portion of a user interface. The input devices 1460 may include an alphanumeric keypad, such as a keyboard, for inputting alphanumeric and other information, or a pointing device, such as a mouse, a trackball, a stylus, or cursor direction keys. The input devices 1460 can also include a camera or scanner. Additionally, the computing system 1400 as shown in FIG. 14 includes optional output devices 1450. Suitable output devices include speakers, printers, network interfaces, and monitors.

The network interface 1470 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1470 may be a network interface card, such as an Ethernet card, optical transceiver, radio frequency transceiver, or any other type of device that can send and receive information. The optional peripheral devices 1480 may include any type of computer support device to add additional functionality to the computer system.

The components contained in the computing system 1400 are intended to represent a broad category of computer components. Thus, the computing system 1400 can be a server, personal computer, hand-held computing device, telephone, mobile computing device, workstation, minicomputer, mainframe computer, network node, or any other computing device. The computing system 1400 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and IR data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for single image-based real-time body animation have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
   receiving, by a computing device, an image of a body;
   receiving, by the computing device via a user interface, a user input including parameters associated with a motion;
   fitting, by the computing device, a portion of the image of the body to a hair model designed to generate a hair image corresponding to the motion, the portion of the image of the body including hair; and
   generating, by the computing device, a video featuring the body repeating the motion, the generation of the video being based on the image of the body, the parameters associated with the motion, and the hair image generated by the hair model.

2. The method of claim 1, wherein the generating the hair image includes:
   determining a hair type associated with the hair; and
   modifying, based on the hair type, an appearance of the hair.

3. The method of claim 2, wherein the modifying the appearance of the hair includes increasing a volume of the hair by using a warping transformation.

4. The method of claim 1, wherein the generating the hair image includes:
   determining that the hair includes at least one shape artifact; and
   in response to the determination, cutting the hair to remove the at least one shape artifact.

5. The method of claim 1, wherein the generating the hair image includes:
   associating the hair with a triangle mesh and a set of control points;
   determining, based on the parameters associated with the motion, first positions of control points of the set of control points;
   updating, based on the first positions of the control points, second positions of points in the triangle mesh; and
   using the triangle mesh to obtain the hair image.

6. The method of claim 5, wherein:
   the image of the body includes a head and a face;
   the set of control points includes fixed control points and mobile control points, the fixed control points being placed on a boundary of the face and the mobile control points being placed on the hair;
   positions of the fixed control points are fixed to the boundary of the face; and
   a position of a mobile control point of the mobile control points is determined based on a further position of a further mobile control point of the mobile control points, the further mobile control point and the mobile control point being located in a chain of the control points, the chain leading to a root control point bound to the head.

7. The method of claim 6, wherein the position of the mobile control point and the further position of the further mobile control point are based on a hair style of the hair.

8. The method of claim 6, wherein the position of the mobile control point and the further position of the further mobile control point are based on a gravity vector.

9. The method of claim 8, further comprising providing, via the user interface, an option enabling a user to modify a parameter of the gravity vector.

10. The method of claim 6, wherein positions of the mobile control points are based on a vector of movement of the mobile control points, the vector of movement being dependent on one or more of the following: a speed proportion, an acceleration factor, and a hair length compression.

11. A computing device comprising:
   a processor; and
   a memory storing instructions that, when executed by the processor, configure the computing device to:
   receive an image of a body;
   receive, via a user interface, a user input including parameters associated with a motion;
   fit a portion of the image of the body to a hair model designed to generate a hair image corresponding to the motion, the portion of the image of the body including hair; and
   generate a video featuring the body repeating the motion, the generation of the video being based on the image of the body, the parameters associated with the motion, and the hair image generated by the hair model.

12. The computing device of claim 11, wherein the generating the hair image includes:
   determining a hair type associated with the hair; and
   modifying, based on the hair type, an appearance of the hair.

13. The computing device of claim 12, wherein the modifying the appearance of the hair includes increasing a volume of the hair by using a warping transformation.

14. The computing device of claim 11, wherein the generating the hair image includes:
   determining that the hair includes at least one shape artifact; and
   in response to the determination, cutting the hair to remove the at least one shape artifact.

15. The computing device of claim 11, wherein the generating the hair image includes:
   associating the hair with a triangle mesh and a set of control points;
   determining, based on the parameters associated with the motion, first positions of control points of the set of control points;

updating, based on the first positions of the control points, second positions of points in the triangle mesh; and using the triangle mesh to obtain the hair image.

16. The computing device of claim 15, wherein:

the image of the body includes a head and a face;

the set of control points includes fixed control points and mobile control points, the fixed control points being placed on a boundary of the face and the mobile control points being placed on the hair;

positions of the fixed control points are fixed to the boundary of the face; and a position of a mobile control point of the mobile control points is determined based on a further position of a further mobile control point of the mobile control points, the further mobile control point and the mobile control point being located in a chain of the control points, the chain leading to a root control point bound to the head.

17. The computing device of claim 16, wherein the position of the mobile control point and the further position of the further mobile control point are based on a hair style of the hair.

18. The computing device of claim 16, wherein the position of the mobile control point and the further position of the further mobile control point are based on a gravity vector.

19. The computing device of claim 18, wherein the instructions further configure the computing device to provide, via the user interface, an option enabling a user to modify a parameter of the gravity vector.

20. A non-transitory computer-readable storage medium, the non-transitory computer-readable storage medium including instructions that, when executed by a computing device, cause the computing device to:

receive an image of a body;

receive, via a user interface, a user input including parameters associated with a motion;

fit a portion of the image of the body to a hair model designed to generate a hair image corresponding to the motion, the portion of the image of the body including hair; and generate a video featuring the body repeating the motion, the generation of the video being based on the image of the body, the parameters associated with the motion, and the hair image generated by the hair model.

* * * * *